US008294669B2

(12) United States Patent
Partridge et al.

(10) Patent No.: US 8,294,669 B2
(45) Date of Patent: Oct. 23, 2012

(54) LINK TARGET ACCURACY IN TOUCH-SCREEN MOBILE DEVICES BY LAYOUT ADJUSTMENT

(75) Inventors: Kurt E. Partridge, Palo Alto, CA (US);
Mark W. Newman, Ann Arbor, MI (US); James M. A. Begole, San Jose, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 860 days.

(21) Appl. No.: 11/986,177

(22) Filed: Nov. 19, 2007

(65) Prior Publication Data
US 2009/0128505 A1    May 21, 2009

(51) Int. Cl.
*G06F 3/033* (2006.01)
(52) U.S. Cl. .................... 345/157; 345/173; 715/858
(58) Field of Classification Search .......... 345/156–184; 715/863
See application file for complete search history.

(56) References Cited

U.S. PATENT DOCUMENTS

| 5,119,079 | A  | * | 6/1992  | Hube et al. ............. | 715/823 |
| 5,491,494 | A  | * | 2/1996  | Cornett et al. .......... | 345/622 |
| 5,745,099 | A  | * | 4/1998  | Blomqvist .............. | 715/862 |
| 5,757,358 | A  | * | 5/1998  | Osga ................... | 715/862 |
| 6,049,326 | A  | * | 4/2000  | Beyda et al. ........... | 345/157 |
| 6,094,197 | A  |   | 7/2000  | Buxton                   |         |
| 6,374,272 | B2 | * | 4/2002  | Bates et al. ........... | 715/207 |
| 6,559,833 | B2 | * | 5/2003  | Rowe ................... | 345/173 |
| 6,567,070 | B1 | * | 5/2003  | Light et al. ........... | 345/157 |
| 6,567,109 | B1 | * | 5/2003  | Todd ................... | 715/862 |
| 6,587,131 | B1 | * | 7/2003  | Nakai et al. ........... | 715/857 |
| 6,643,824 | B1 | * | 11/2003 | Bates et al. ........... | 715/205 |
| 6,925,496 | B1 | * | 8/2005  | Ingram et al. .......... | 709/224 |
| 7,047,503 | B1 |   | 5/2006  | Parrish                  |         |
| 7,076,743 | B2 | * | 7/2006  | Ingram et al. .......... | 715/854 |
| 7,084,859 | B1 | * | 8/2006  | Pryor .................. | 345/173 |

(Continued)

FOREIGN PATENT DOCUMENTS
EP    1847915 A2    10/2007
(Continued)

OTHER PUBLICATIONS

Hrvoje Benko et al., Precise Selection Techniques for Multi-Touch Screens, Apr. 22, 2006, Association for Computing Machinery (ACM), Proceedings of the SIGCHI conference on Human Factors in computing systems, p. 1263-1272.*
Apitz, G et al., "CrossY: a crossing-based drawing application", ACM Transactions on Graphics, AMC, US, vol. 6, No. 2, Jul. 1, 2005, pp. 3-12.
Gordon Paul Kurtenbach: "The Design and Evaluation of Marking Menus", PhD Thesis of Toronto, Jan. 1, 1993, pp. 1-192.

*Primary Examiner* — Alexander Eisen
*Assistant Examiner* — Sanjiv D Patel
(74) *Attorney, Agent, or Firm* — Shun Yao; Park, Vaughan, Fleming & Dowler LLP (57) ABSTRACT

One embodiment of the present invention provides a system for improving link target accuracy for a mobile browser with a touch-screen display. The system receives a page with a plurality of selectable text objects and adjusts the page layout. The method further includes placing a number of targets within the web page. Each target is associated with one selectable text object, and the selectable text object can only be activated by the target. The targets are sufficiently separated from each other, thus allowing a user to hold the touch-screen display and select the selectable text object by tapping on the target with substantial accuracy. Another embodiment of the present invention allows a user to select a selectable text object by performing a gesture.

14 Claims, 11 Drawing Sheets
(7 of 11 Drawing Sheet(s) Filed in Color)

U.S. PATENT DOCUMENTS

| | | | |
|---|---|---|---|
| 7,614,008 B2 * | 11/2009 | Ording | 715/773 |
| 2002/0116415 A1 * | 8/2002 | Dutta et al. | 707/516 |
| 2005/0052406 A1 * | 3/2005 | Stephanick et al. | 345/156 |
| 2006/0026521 A1 * | 2/2006 | Hotelling et al. | 715/702 |
| 2006/0085757 A1 * | 4/2006 | Andre et al. | 715/771 |
| 2006/0242607 A1 | 10/2006 | Hudson | |
| 2007/0168890 A1 | 7/2007 | Zhao | |

FOREIGN PATENT DOCUMENTS

| | | |
|---|---|---|
| EP | 2042978 A2 | 4/2009 |
| GB | 2351639 A | 1/2001 |
| JP | 2004118484 | 9/2002 |
| WO | 2009008161 A1 | 1/2009 |

\* cited by examiner

LINK TARGET ACCURACY IN TOUCH-SCREEN MOBILE DEVICES BY LAYOUT ADJUSTMENT

BACKGROUND

1. Field of the Invention

The present disclosure relates to computer user interfaces. More specifically, the present disclosure relates to a user interface for a touch-screen mobile device to improve link target accuracy by layout adjustment.

2. Related Art

Recent developments of mobile computing technologies have allowed unprecedented integration of various functions into a single hand-held device. For example, a smart phone can provide voice communication, Internet access, audio/video entertainment, gaming, and global positioning information to a user. Furthermore, new display technologies have enabled larger, brighter, and higher-resolution displays with more sensitive and precise touch-screen capabilities. These technological advances, coupled with faster mobile processors and cheaper, larger memories, can now provide a platform for new applications that has not been possible in the past. In particular, the development of new mobile browsers has offered mobile users a similar web browsing experience to that of a desktop computer user.

SUMMARY

One embodiment of the present invention provides a system for improving link target accuracy for a mobile device with a touch-screen display. During operation, the system displays a page which includes a plurality of selectable text objects on the touch screen. The system further defines a number of target regions on the touch screen, wherein a target is associated with one selectable text object, and wherein the selectable text object can be activated by the target. The system also indicates to a user that the selectable text object can be selected by tapping on the target, wherein the target is sufficiently separated from other targets, thereby allowing a user to select the selectable text object with substantial accuracy.

In a variation on this embodiment, the target includes one or more characters that are part of the selectable text object and are distinguishable from the rest of the selectable text object.

In a further variation, the character is distinguishable from the rest of the selectable text object by the color of the character and/or the background color of the character.

In a further variation, the system selects the character for the target based on the distance between the selected character and target characters of one or more adjacent selectable text objects.

In a variation on this embodiment, the target includes a graphic element that indicates the position of the target, and the target is optionally hidden until the user activates the appearance of the target.

A further embodiment of the present invention provides a system for improving link target accuracy for a mobile device with a touch-screen display. The system displays a page that includes a plurality of selectable text objects on the touch screen. The system further allows a user to select a selectable text object by sliding a finger on the surface of the touch-screen, wherein the selectable text object is selected based on both the starting center of the contact and the sliding direction of the finger, thereby allowing the user to select the selectable text object with substantial accuracy.

In a variation on this embodiment, the system allows the user to select the selectable text object by placing a finger at the center of the selectable text object and sliding it toward a direction that is the furthest away from the center of the nearest other selectable text object.

In a variation on this embodiment, the system displays a suggested direction, wherein the suggested direction can be normally hidden unless the user activates the display of the suggested direction.

In a further variation, the direction is indicated by icons or color gradations.

BRIEF DESCRIPTION OF THE FIGURES

The patent or application file contains at least one drawing executed in color. Copies of this patent or patent application publication with color drawing(s) will be provided by the Office upon request and payment of the necessary fee.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

The data structures and code described in this detailed description are typically stored on a computer-readable storage medium, which may be any device or medium that can store code and/or data for use by a computer system. This includes, but is not limited to, volatile memory, non-volatile memory, application-specific integrated circuits (ASICs), field-programmable gate arrays (FPGAs), magnetic and optical storage devices such as disk drives, magnetic tape, CDs (compact discs), DVDs (digital versatile discs or digital video discs), or other media capable of storing computer readable media now known or later developed.

Overview

Although hand-held mobile devices with touch-screens have gained great popularity during the past decade, users often struggle with the difficulty of accurately selecting an object on the touch-screen. Sometimes the object is a hyperlink on a web page, as in the case of a web browser, and sometimes the object is a name of a song or a title of a video clip, as in the case of a multi-media player. Most mobile devices with touch-screens allow a user to make a selection by tapping on the image of the selectable object, which can be a text string or an icon. The closeness of adjacent objects, for example a list of song titles in an MP3 player, often makes it difficult for a user to accurately select the desired object.

Figure 1:
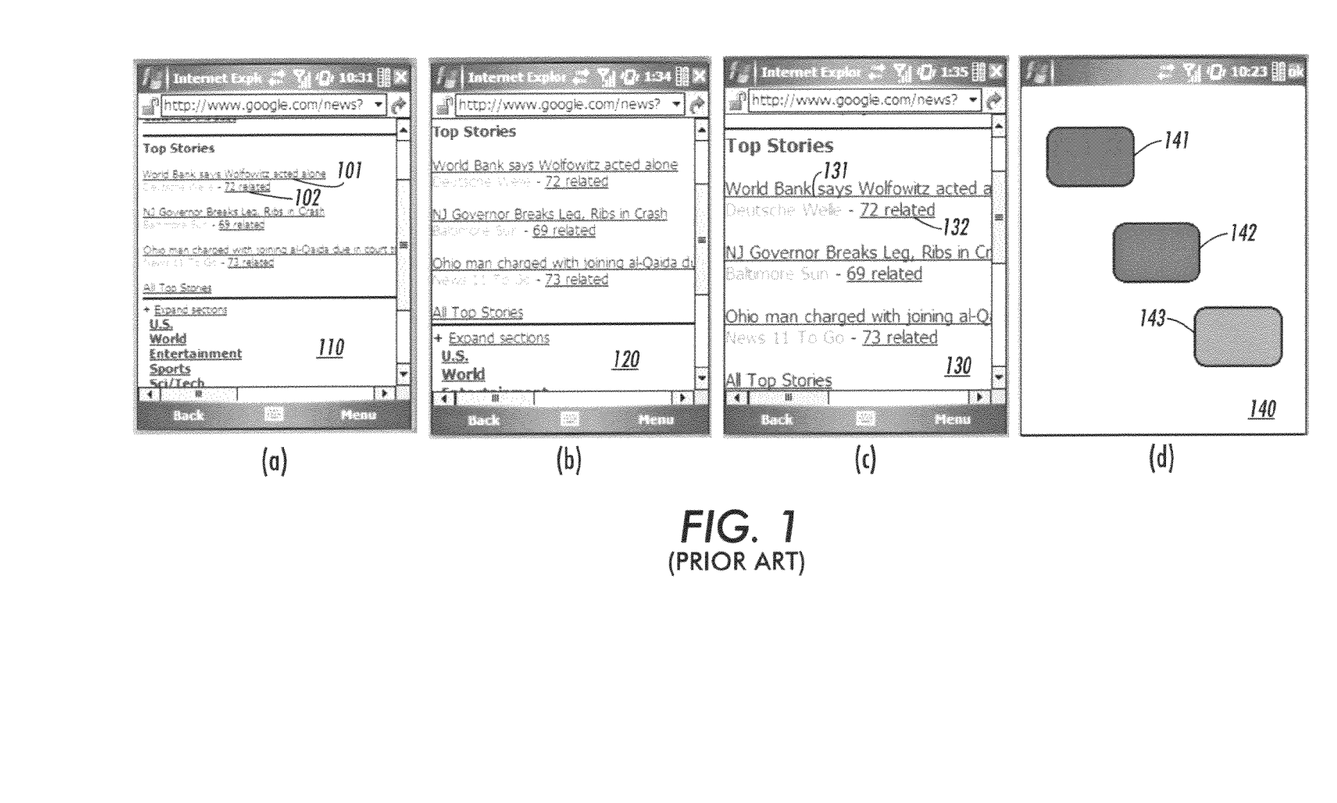
FIGS. 1(a)-(c) present screen shots of web pages displayed on a mobile browser with small, medium, and large font size, respectively.
FIG. 1(d) illustrates the typical minimum target size for accurately selecting a target.

This problem is more serious for mobile web browsers. Most web pages are not designed for display on a hand-held device, and objects of a regular web page often appear overcrowded on a smaller screen. In addition, today's mobile browsers with touch-screens render web pages without accounting for how close the hyperlinks appear on the small screen. FIG. 1(a) shows a screen shot of a mobile browser displaying the Google® News web page. Note that, on touch-screen display 110, the hyperlinks appear fairly close to each other, making it very difficult for users to make selections by tapping with a finger. This is especially true for those hyperlinks that are next to each other, such as hyperlinks 101 and 102. The font size for touch-screen display 110 is consequently small. FIG. 1(b) shows the same web page displayed with a medium font size on touch-screen display 120, and FIG. 1(c) shows the same display with a large font on touch-screen display 130.

It is evident that the use of a larger font makes it easier to select hyperlinks. However, most users prefer having their web pages displayed in smaller fonts because the use of a smaller font allows more text to be viewed on a single page at once. In addition, even displayed with the largest fonts, the hyperlinks on two adjacent lines can still be too close to each other to be distinguished by a tap of a user's thumb. For comparison, FIG. 1(d) displays buttons 141, 142 and 143 on touch-screen display 140, wherein the size of these buttons reflects a typical minimum target size required for accurately selecting a target by the tap of a thumb. Note that the height of button 141 is larger than the combination of hyperlinks 131 and 132 shown in FIG. 1(c), in which hyperlinks are displayed with the largest font.

The crowdedness of the hyperlinks on a touch-screen display makes it difficult for users to select a desired link with a finger tap. The broad area of a finger tip, especially that of a thumb, can often cause a mis-selection of a link. For example, a user may want to select hyperlink 102 by tapping on the hyperlink text with his thumb. However, due to the closeness of hyperlink 101, such a tap is very likely to land on hyperlink 101, thus resulting in an undesired selecting of hyperlink 101. Although the use of a stylus can greatly increase the accuracy of the hyperlink selection, such an operation is more complex and requires both hands. Therefore, it is desirable to provide a method for improving the accuracy of link target on a touch screen, especially when the touch screen is operated by one hand.

Some mobile browsers adopt a scheme that loads the web page with significantly larger fonts, which makes hyperlink selection easier but requires a user to scroll not only up and down but also right and left in order to view the content of the whole web page. This is problematic because the user tends to forget where he was when viewing such a large page. Another scheme adopted by mobile browsers allows a user to first scroll through a condensed web page, find the place of interest, and then zoom-in. The enlarged page makes it easier to select hyperlinks. However, such an approach has its own problems, because the zoom-in operation requires a longer interaction time.

Embodiments of the present invention provide a method that can provide users of touch-screen mobile devices with improved link target accuracy without the aforementioned problems. In particular, the application of this method allows a user to select an object with ease and precision, especially when the user is operating the mobile device with one hand. Using embodiments of the present invention, the user can now operate the mobile device with one finger or the thumb of the holding hand.

For demonstration purposes only, the following discussions are based on the case of using a mobile browser to select hyperlinks on a web page. However, it should be noted that different embodiments of this invention can be applied to other mobile devices that require a user to make selections on a touch-screen display. Therefore the scope of the invention is not limited to mobile browsers, but also covers any user interface that displays selectable text objects.

During operation, the mobile browser with a touch-screen display first receives the content of a web page, and then renders and displays the web page content onto the touch screen. The web page often includes a plurality of hyperlinks for a user to make further selection. The traditional way for a user to make a hyperlink selection is to tap on the hyperlink text with the tip of his finger or stylus. In one-hand-operation, a user often holds the mobile browser with one hand and uses the thumb of that holding hand to tap on the touch screen to select a hyperlink. However, the hyperlinks displayed on the touch screen are often very close to each other, making it difficult for the user to accurately tap a desired hyperlink. For example, as shown in FIG. 1(a), hyperlinks 101 and 102 are immediately beside each other. When the desired selection is hyperlink 102, it is very difficult for a user to avoid an accidental selection of hyperlink 101.

One embodiment of the present invention provides a method for mobile browsers to improve the accuracy of hyperlink selection, thus allowing a user to operate the mobile browser with one hand. Instead of tapping on the image of the entire hyperlink, the user is directed to tap on a target region defined on the touch screen. The target region can be a portion of the hyperlink text or outside of the hyperlink text. Each target is associated with a particular hyperlink and is substantially separated from other targets. Therefore, when the user taps a target with a finger, the substantial distances among the targets can ensure a relatively easy and accurate selection. This is true even when the user's tap slightly misses the intended target. As long as the desired target is the closest target to the tap, a correct hyperlink selection will be made. In addition to improved accuracy, the increased distances among the targets can result in an enlarged effective target size, which makes it possible for a user to navigate the web page more quickly.

Another embodiment of the present invention provides a method to suggest to a user to select a hyperlink by sliding a finger (using a gesture) on the surface of the touch-screen. A hyperlink is selected based on both the starting center of the contact and the sliding direction of the finger. Selecting a hyperlink by using a gesture is advantageous because a gesture can provide more information about the user's intention compared with a single tap on the touch-screen. For example, the duration together with the direction of the gesture can provide information about the user's desired selection with less ambiguity.

Selecting a Hyperlink by Tapping a Target

Figure 2:
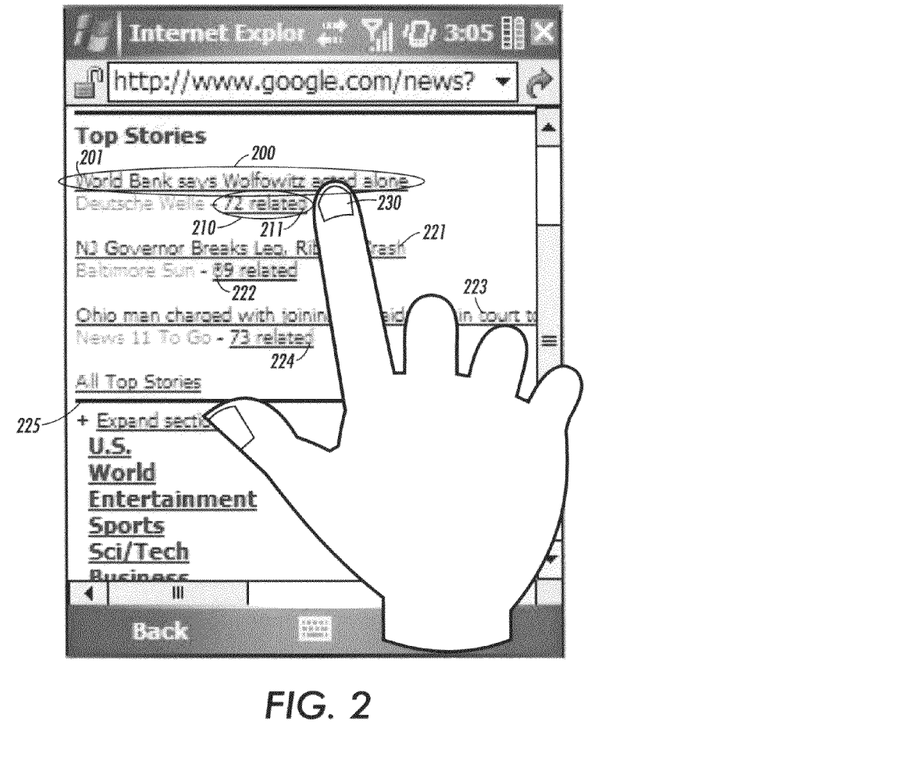
FIG. 2 presents an example of link target based on characters which are part of hyperlinks in accordance with one embodiment of the present invention.

FIG. 2 presents an example of one embodiment, in which a user selects a hyperlink by tapping on a predefined target, and the target is part of the text of the hyperlink. In this example, one particular character in each hyperlink is selected as the target associated with that hyperlink. To indicate the positions of the target character, different visual schemes can be used in order to distinguish it from the rest of the hyperlink text. Examples of such visual schemes include, but are not limited to: changing the color and/or the font of the selected characters.

In the example shown in FIG. 2, the beginning and ending characters of the hyperlinks are selected alternatively as targets. For example, the character "W" is selected as target 201 for hyperlink 200, and the character "d" is selected as target 211 for hyperlink 210. Other selected characters include characters 221, 222, 223, 224 and 225. If the user intends to select hyperlink 210, he would need to tap on target 211, the character "d," instead of tapping on another part of the image of hyperlink 210. Consequently, the separation between targets 201 and 211 is much greater than the separation of images of hyperlinks 200 and 210, thus allowing the user to make a more accurate selection. Even in cases where the user's finger 230 misses target 211 by a significant amount and taps on the neighboring hyperlink 200 as shown in FIG. 2, as long as the closest target to the tap is target 211, the correct hyperlink 210 will be selected.

Because the target is part of the hyperlink text, it is important to make the user aware of the position of the target by distinguishing it from the rest of the hyperlink. This is usually done by visually distinguishing the target character from the rest of the hyperlink. In one embodiment of the present invention, a color scheme is used to indicate the position of a target character. For example, a target character can be displayed in a color different from the rest of the hyperlink. In normal cases where the hyperlink is displayed in blue, the target character may be displayed in colors other than blue, such as green. As shown in FIG. 2, all hyperlinks are displayed in blue, and all target characters 201, 211, and 221-225 are displayed in green. An alternative color scheme is to change the background color of the target characters, thus distinguishing them from the rest of the hyperlink. Yet another color scheme is to apply a color gradation, such as using a stronger background color for the target characters and making it more transparent further away from the target characters (see FIG. 10). The use of the color scheme is advantageous, because it causes little change to the appearance of the web page.

Other visual mechanisms of distinguishing the target character include changing the font, such as displaying the target characters in a boldface font or an italic font. In addition, boxes or circles can be used to surround the target character to distinguish it from the rest of the hyperlink text.

In one embodiment of the present invention, the target characters are chosen based on the relative distances among them. A number of approaches can be used to calculate which characters should be selected as targets.

Figure 3:
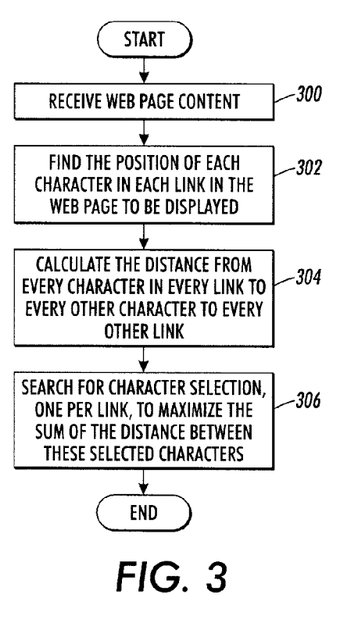
FIG. 3 presents a flow chart illustrating the process of selecting characters based on their relative distances in accordance with one embodiment of the present invention.

FIG. 3 shows an exemplary process for selecting target characters for all hyperlinks. At step 300, web page content including hyperlinks is received. The system then finds the position of every character in every hyperlink (step 302). The system further calculates, for every character in every link, the distance to every other character in every other link (Step 304). Next, the system uses the calculated distances to search for the selection of characters, one per hyperlink, that maximize the distances between these selected characters (Step 306).

Figure 4:
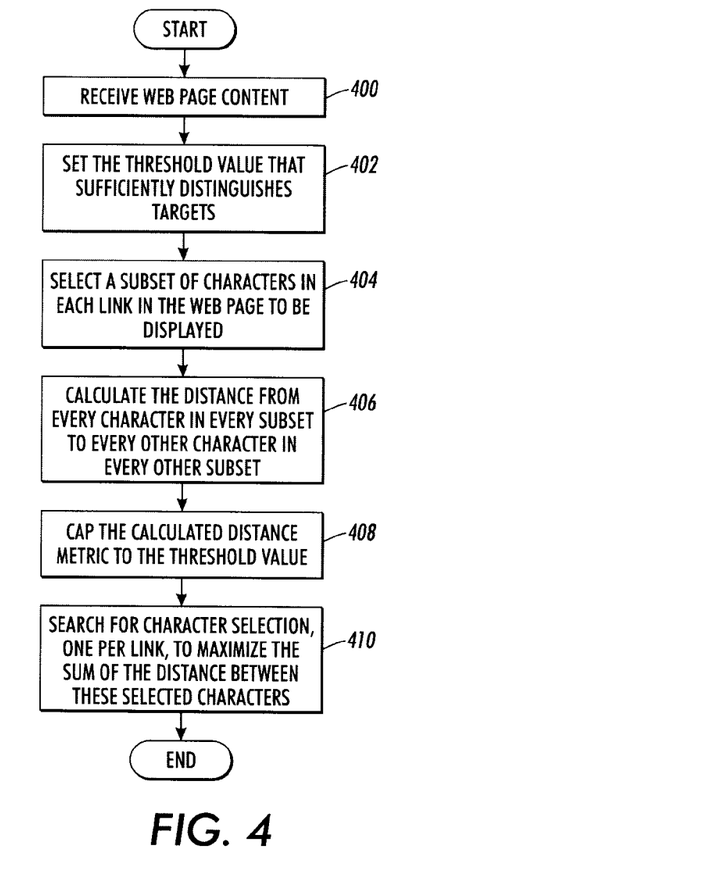
FIG. 4 presents a flow chart illustrating the process of selecting characters based on their relative distances in accordance with another embodiment of the present invention.

Another approach is shown in FIG. 4. During operation, the system receives web page content including hyperlinks (step 400). The system then sets a threshold value that sufficiently distinguishes targets (step 402). In order to make the search more efficient, only a subset of characters in every link is considered. Note that the subset of characters could be part or all of the characters in the hyperlink. The system further selects one subset per hyperlink (Step 404). Examples of characters in the subset include characters at extreme positions, such as the first and last points, the mid-point, the one-third and two-thirds points, etc. Next, the system calculates the distance from every character in every subset to every other character in every other subset (step 406). Ideally, the system caps the distance metric to the threshold value (step 408). By capping the distance metric to a threshold value, the system can avoid the undesirable situation where the system maximizes the overall distance by selecting characters that are close to each other but further away from other distant targets. Finally, the system uses the calculated distances to search for the selection of characters, one per hyperlink, that maximize the distances between these selected characters (step 410). Note that in order to improve the search efficiency, the system may choose not to calculate distances among characters of two hyperlinks if the two hyperlinks are sufficiently far away from each other, because the two targets can be easily distinguished by the user.

Figure 5:
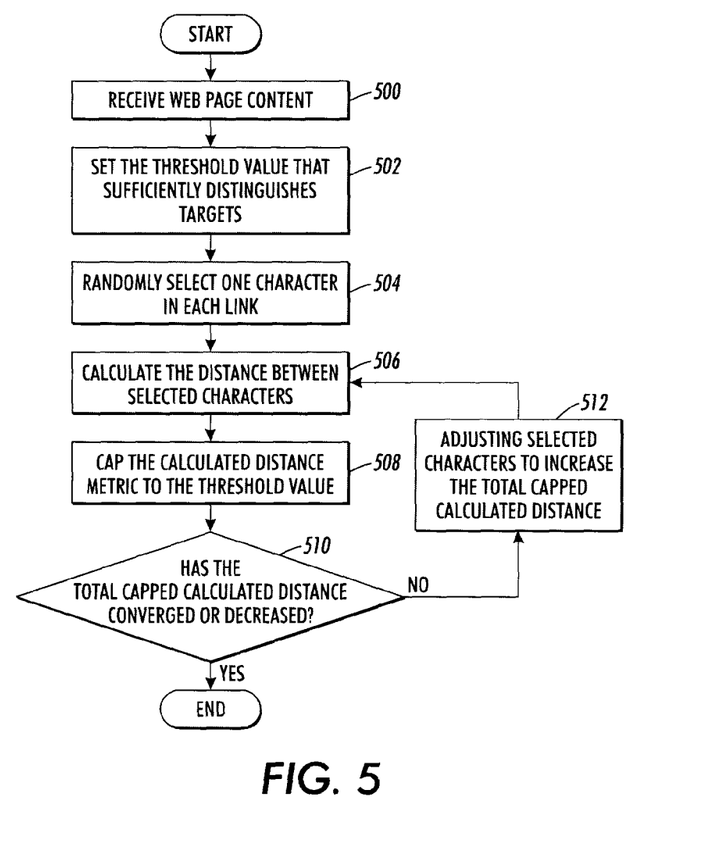
FIG. 5 presents a flow chart illustrating the process of selecting characters based on their relative distances in accordance with the third embodiment of the present invention.

FIG. 5 shows yet another approach to select characters. Web page content including hyperlinks is received (step 500), and a threshold value that sufficiently distinguishes the targets is set (step 502). The system randomly selects one character for each hyperlink (step 504), and calculates the distance between the selected characters (step 506). Ideally, the system caps the calculated distance metric by the threshold value (step 508). Subsequently, the system checks whether the total capped calculated distance has converged or decreased (step 510). If so, the operation ends. Otherwise, the system makes an adjustment that is expected to increase the total capped calculated distance (step 512) and continues the iteration (step 506).

It should be noted that the aforementioned processes for optimizing relative distance between targets that are associated with hyperlinks are presented for exemplary purposes only. Many other general purpose optimization methods can also be applied.

A further embodiment of the present invention is to treat the whole hyperlink as a target, and the user selects a hyperlink using the traditional way of tapping on the hyperlink text. However, the text for the hyperlinks is reflowed in a way such that the hyperlinks are not close to each other. This technique allows the web page to be displayed in a way that appears exactly like a normal web page on a conventional display.

Figure 6:
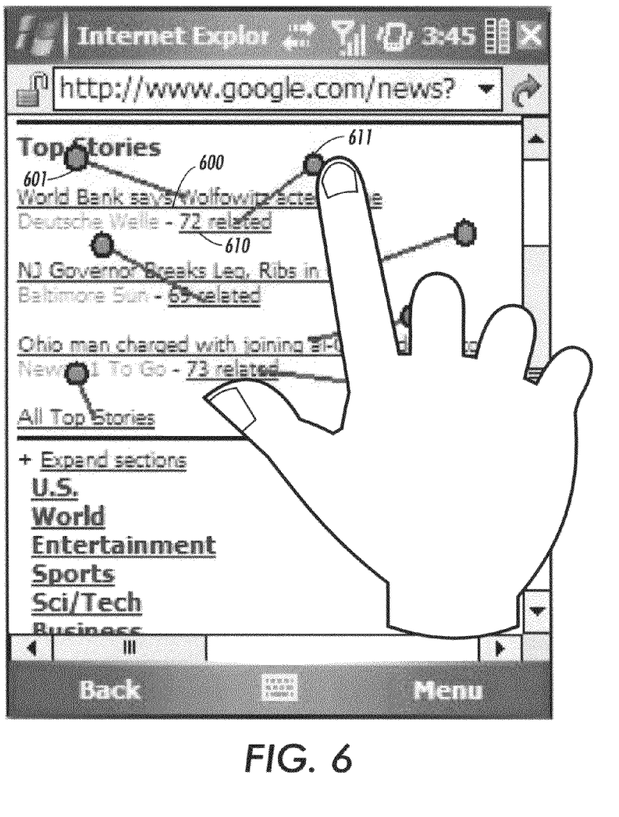
FIG. 6 presents an example of using a graphic element to indicate the positions of targets in accordance with one embodiment of the present invention.

FIG. 6 shows another embodiment of the present invention, in which the targets are displayed by additional graphic elements. The target regions for hyperlinks are located away from the hyperlinks' text, such as targets 601 and 611. These targets are placed in such a way as to be sufficiently separated from each other. The positions of the targets are indicated by overlaying a transparent layer with graphic elements on top of the web page. Each target is associated with one particular hyperlink. Thus, instead of tapping on the image of a hyperlink, the system suggests that a user should tap on a target that is away from the desired hyperlink. For example, targets 601 and 611 are associated with hyperlinks 600 and 610, respectively. If the user wishes to select hyperlink 610, he will tap on or in the vicinity of target 611, instead of tapping on hyperlink text 610. Note that although hyperlinks 600 and 610 are very close to each other, targets 601 and 611 are substantially separated, making it easier for the user to tap on targets thus select hyperlinks accurately. In one embodiment, to avoid crowding the layout, the targets are not visible under normal conditions. When the user is ready to select a hyperlink, he can trigger the display of the targets by a physical interaction. Examples of such a physical interaction include, but are not limited to: holding down a button on the device, shaking or tilting the device, touching one particular point or two points on the screen, or, in the case of a touch-screen with a capacitive sensor, poising one or more fingers above the screen. Note that it is not necessary to provide external targets for all hyperlinks. In one embodiment, only links that are sufficiently crowded by other hyperlinks are assigned external target positions, while other links can be selected the conventional way.

Selecting a Hyperlink by Gesturing

Figure 7:
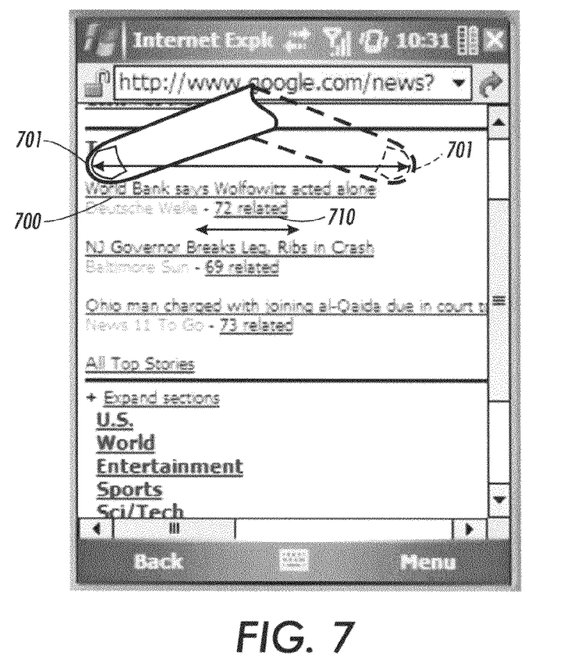
FIG. 7 presents an example of using a gesture to select a hyperlink in accordance with one embodiment of the present invention.

FIG. 7 shows an example of selecting a hyperlink based on a gesture. Instead of tapping onto a target, the system suggests to a user that a gesture is needed to select a hyperlink. To make a gesture, the user first places his fingertip on the surface of the touch screen and then slides it in a certain direction. It is advantageous to select hyperlinks based on gestures because a gesture can provide more information about the user's intention than a simple tap on the surface of the touch-screen. The system can use information, such as the starting center of the contact, the duration of the gesture, and the direction of the gesture, to evaluate the user's intention. In the example illustrated in FIG. 7, a user selects a hyperlink by dragging his fingertip from one end of the hyperlink to the other end. For instance, the user can select hyperlink 700 by dragging his fingertip 701 from one end of hyperlink 700, where the character "W" is, to the other end of hyperlink 700, where the character "e" is. Even if the dragging wanders back and forth between the two adjacent hyperlinks 700 and 710, the duration or length of the gesture can be used to distinguish between the selections of these two hyperlinks. Note that the user can also drag his fingertip between "7" and "d" in hyperlink 710 in order to select hyperlink 710.

Figure 8:
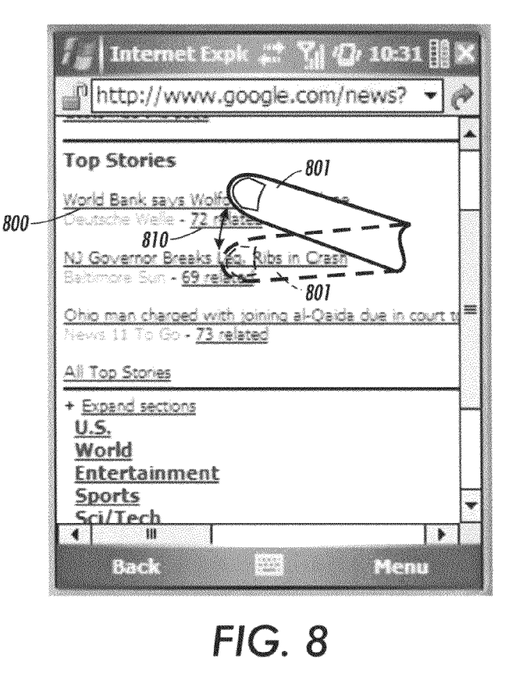
FIG. 8 presents an example of using a gesture to select a hyperlink in accordance with another embodiment of the present invention.

FIG. 8 shows another example of selecting a hyperlink based on a gesture, in which a user selects a hyperlink by gesturing across multiple hyperlinks. As a result, the smallest hyperlink crossed would be selected. In the example illustrated in FIG. 8, finger tip 801 is dragged across hyperlinks 800 and 810. Because hyperlink 810 has a shorter text line compared with hyperlink 800, hyperlink 810 will be selected.

Figure 9:
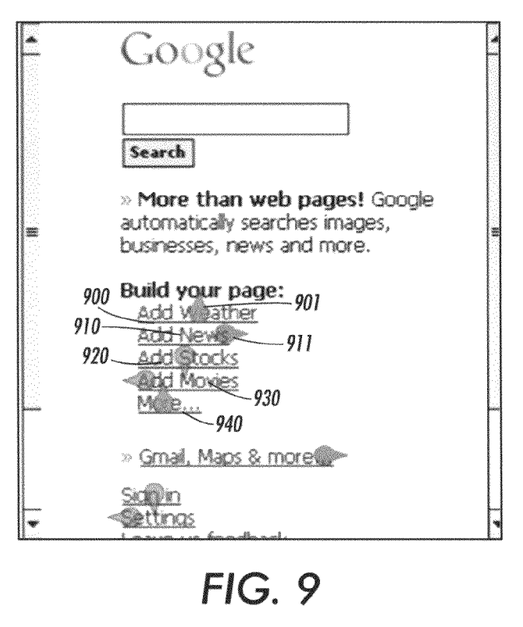
FIG. 9 presents an example of using gesture-direction-suggesting icons to indicate gesture directions in accordance with one embodiment of the present invention.

FIG. 9 shows yet another example of selecting a hyperlink based on a gesture, in which a user selects a hyperlink by first tapping on the center position of the hyperlink and then sliding his finger slightly toward the direction that is furthest away from the center of the nearest hyperlink. For instance, the user selects hyperlink 900 by first placing his fingertip on the center of hyperlink 900, then sliding it upward, because this direction points away from the center of the closest hyperlink 910. In one embodiment, the system is configured to treat the gesture as more informative about the user's desired hyperlink than the starting center. For example, if the user wishes to select hyperlink 910, he can first tap on the center of hyperlink 910, then roll the contact to the right, because this direction points away from the centers of hyperlinks 900 and 920. Although the user may miss the center of hyperlink 910 and tap on the center of hyperlink 900 instead, as long as the contact point rolls to the right, hyperlink 910 will be selected. Under certain circumstances, gesture-direction-ambiguity may exist, such as the selection of hyperlink 930, whose center is approximately linearly centered between hyperlinks 920 and 940. In this case, in order to select hyperlink 930, the user would need to roll the contact point either up and to the right or down and to the left.

In order to assist a user with hyperlink selection based on a gesture, the system can be configured to display on the touch-screen the suggested gesture direction for each hyperlink. One embodiment of the present invention uses icons to indicate the suggested directions as shown in FIG. 9. Icon 901 with the sharpened tip pointing upward overlapping with hyperlink 900 suggests an upward gesture is needed in order to select hyperlink 900. Similarly, icon 911 with the sharpened tip pointing to the right suggests that a user can roll (or slide) his finger to the right to select hyperlink 910. The predetermined gesture direction for each hyperlink avoids the problem of gesture-direction-ambiguity. In a further embodiment, the gesture-direction-suggesting icons do not obscure the hyperlinks. Rather than overlapping with the text of the hyperlinks, as shown in FIG. 9, the icons can appear after the hyperlinks if there are spaces. Alternatively, the mobile browser can add these icons in a way that does not disturb the general layout of the web page. That is, the web page is first rendered by the browser as if there were no icons, and then the icons are added after the rendering is done. This way, the creator of the web page can still rely on the hyperlinks being placed the way they would expect them to be placed for any browsers, whether or not they have this additional capability for smart selection.

Figure 10:
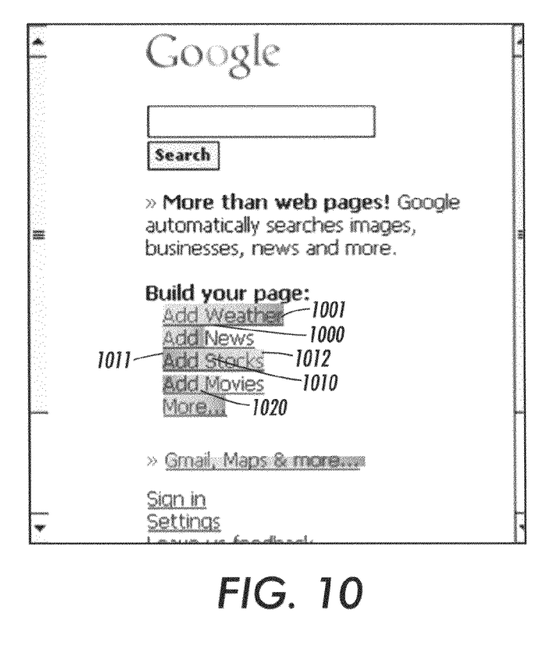
FIG. 10 presents an example of using color gradation to indicate how to select a hyperlink in accordance with one embodiment of the present invention.

FIG. 10 shows another embodiment of the present invention, in which the system uses a color gradation to indicate how to select a hyperlink. Two alternatives are shown here. The first alternative is that a color scheme is used to indicate where a user can directly tap (e.g., tap on the part that has a darker background color) to select the hyperlink. For instance, the user can directly tap on position 1001, which has a dark purple background, or its vicinity, to select hyperlink 1000. Another alternative is to use the color gradation to indicate a gesture direction (e.g., drag a finger from a location with darker background to a location with lighter background, starting from the location with darker background). For instance, the user is directed to drag his finger from position 1011, which has the dark purple background, to position 1012, which has a light pink background, in order to select hyperlink 1010.

Selecting a hyperlink based on the combination of the starting point and dragging length makes the selection less ambiguous. For example, the starting points of hyperlink 1010 and hyperlink 1020 are very close to each other, thus a simple tap on the starting points may easily result in a misselection. However, as suggested by the color gradation, the user is directed to drag his finger further to the right in order to select hyperlink 1010, which clearly indicates his selection of hyperlink 1020. Note that the color gradation can be either horizontal or vertical, although FIG. 10 only shows horizontal gradations. Another technique that can be integrated with the present invention includes using different colors to indicate different gesturing directions. For example, the gestures in the horizontal direction can use one color gradation scheme such as purple to pink, as shown in FIG. 10, and the ones in the vertical direction can use another color gradation scheme such as purple to green. The use of different color gradation schemes for different gesture orientations would make it easier for a user to distinguish between the side-to-side and up-down directions. This is particularly useful when the user is selecting hyperlinks that have only a few characters in them. Color gradation is advantageous because it results in a more legible web page than other techniques that have sharp color differences within a single line of text.

The display of the gesture-direction-suggesting icons and/or color gradations may sometimes interfere with the reading of the content of the web page. Thus it is desirable to hide these features unless the user performs a physical interaction that causes them to appear. For example, there could be a capacitive sensor installed on the device that detects when the user touches one particular point or two surface points or when the user's hand is poised above the screen. An alternative physical interaction method is to incorporate accelerometer tilt, in which the display of icons or color gradation is activated when the user shakes the device. Moreover, the user may simply push a button on the device to trigger the appearance of the icons. Note that other physical interactions for triggering the appearance of icons are also possible.

Choosing the Techniques

As stated above, there are multiple ways in which the system could improve hyperlink target accuracy by adjusting web layout. Thus it is desirable to configure the system in a way that allows web page creators to choose among the different schemes. For instance, a web page creator can include hints in the hyper-text-markup-language (HTML), or other markup languages, to indicate how the page should be modified to visually suggest to a user how to select a hyperlink. The web page creator can indicate which specific technique he would prefer (such as techniques shown in FIG. 2 and FIGS. 6-10), and/or the details of the technique. For example, if the web page creator chooses to use the technique shown in FIG. 2, he could indicate which characters should be used as targets. Or if the web page creator chooses the technique shown in FIG. 9, he could indicate the gesture direction that each hyperlink should have, and/or where the gesture-direction-suggesting icon should appear.

Note that the aforementioned techniques to improve hyperlink target accuracy are only examples of embodiments of the present invention. Other techniques that can improve hyperlink target accuracy are also possible.

Figure 11:
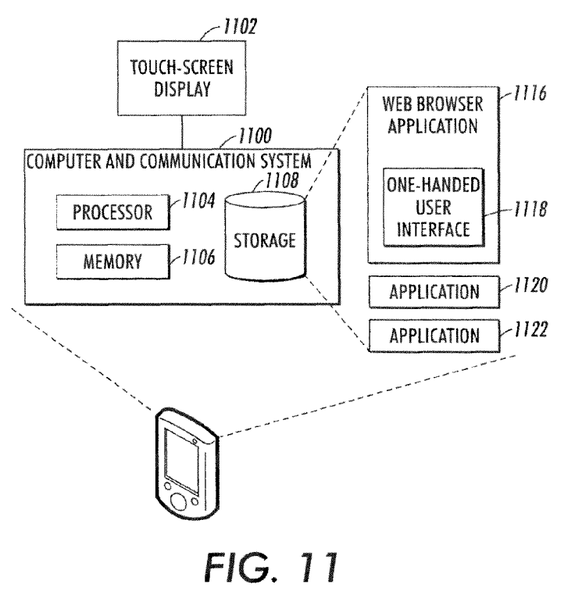
FIG. 11 illustrates an exemplary computer system with a user interface for a web browser for improving hyperlink target accuracy by web layout adjustment in accordance with one embodiment of the present invention.

FIG. 11 illustrates an exemplary computer system with a user interface for improving hyperlink target accuracy by web layout adjustment in accordance with one embodiment of the present invention. In one embodiment, a computer and communication system 1100 is coupled to a touch-screen display 1102, which serves as both the input and output device. Computer and communication system 1100 includes a processor 1104, a memory 1106, and a storage device 1108.

Storage device 1108 stores a web browser application 1116, as well as other applications, such as applications 1120 and 1122. In one embodiment, web browser application 1116 further includes a program that facilitates a user interface 1118 which supports a one-hand operation and facilitates a user with increased link-selection accuracy using one or more of the aforementioned methods.

During operation, web browser application 1116 is loaded from storage device 1108 into memory 1106 and then executed by processor 1104. While executing the program, processor 1104 performs the aforementioned functions.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for improving link target accuracy for a mobile device with a touch-screen display, the method comprising:
    displaying a page which includes a plurality of selectable text objects on the touch screen;
    defining a number of targets on the touch screen, wherein a respective target is associated with a selectable text object, and wherein defining a target involves:
        measuring a distance from a character within the selectable text object to a different character within an adjacent selectable text object; and
        marking the character within the selectable text object as the target in response to the measured distance exceeding a threshold, thereby resulting in the target being separated from other targets such that an accurate selection of the selectable text object is made by a tap close to the target; and
    indicating to a user that the selectable text object is selectable by tapping on its associated target.

2. The method of claim 1,
    wherein the character is distinguishable from the rest of the selectable text object by:
    the color of the character, and
    the background color of the character.

3. The method of claim 1,
    wherein the target includes a graphic element that indicates the position of the target; and
    wherein the target is optionally hidden until the user activates the appearance of the target.

4. A method for improving link target accuracy for a mobile device with a touch-screen display, the method comprising:
    displaying a page which includes a plurality of selectable text objects on the touch screen; and
    suggesting to a user a gesture associated with a selectable text object by displaying a suggested gesture direction, wherein the selectable text object is selected by performing the gesture on the surface of the touch screen, wherein the suggested gesture direction is indicated by a color-coded icon that indicates a gesture orientation using a color corresponding to the gesture orientation.

5. The method of claim 4, wherein the suggested gesture direction can be normally hidden unless the user activates the display of the suggested direction.

6. The method of claim 5,
    wherein the suggested gesture direction is indicated by an icon or a color gradation.

7. A non-transitory computer-readable medium storing instructions which when executed by a computer cause the computer to perform a method for improving link target accuracy for a mobile device with a touch-screen display, the method comprising:
    displaying a page which includes a plurality of selectable text objects on the touch screen;
    defining a number of targets on the touch screen, wherein a respective target is associated with a selectable text object, and wherein defining a target involves:
        measuring a distance from a character within the selectable text object to a different character within an adjacent selectable text object; and
        marking the character within the selectable text object as the target in response to the measured distance exceeding a threshold, thereby resulting in the target being separated from other targets such that an accurate selection of the selectable text object is made by a tap close to the target; and indicating to a user that the selectable text object is selectable by tapping on its associated target.

8. The computer-readable medium of claim 7,
wherein the character is distinguishable from the rest of the selectable text object by:
the color of the character, and
the background color of the character.

9. The computer medium of claim 7,
wherein the target includes a graphic element that indicates the position of the target; and
wherein the target is optionally hidden until the user activates the appearance of the target.

10. A non-transitory computer-readable storage medium storing instructions which when executed by a computer cause the computer to:
display a page including a plurality of selectable text objects on the touch screen; and
suggest to a user a gesture associated with a selectable text object by displaying a suggested gesture direction, wherein the selectable text object is selected by performing the gesture on the surface of the touch screen, wherein the suggested gesture direction is indicated by a color-coded icon that indicates a gesture orientation using a color corresponding to the gesture orientation.

11. The computer-readable medium of claim 10, wherein the suggested gesture direction can be normally hidden unless the user activates the display of the suggested direction.

12. The computer-readable medium of claim 11,
wherein the suggested gesture direction is indicated by an icon or a color gradation.

13. A user interface for a mobile browser, the user interface comprising:
a touch-screen display;
a page presented on the touch-screen display showing a plurality of selectable text objects; and
a number of targets defined on the touch-screen display, wherein a respective target is associated with a selectable text object, and wherein a target is defined by:
measuring a distance from a character within the selectable text object to a different character within an adjacent selectable text object; and
marking the character within the selectable text object as the target in response to the measured distance exceeding a threshold, thereby resulting in the target being separated from other targets such that an accurate selection of the selectable text object is made by a tap close to the target.

14. A user interface for a mobile browser, the user interface comprising:
a touch-screen display; and
a page presented on the touch-screen display showing a plurality of selectable text objects;
wherein a selectable text object is associated with a gesture having a suggested gesture direction, which indicates to a user that the selectable text object is selected by performing the gesture on the surface of the touch-screen display, wherein the suggested gesture direction is indicated by a color-coded icon that indicates a gesture orientation using a color corresponding to the gesture orientation.

\* \* \* \* \*